May 25, 1937.  F. GABRIEL  2,081,807
KNIFE BLADE FOR MEAT CUTTERS OR THE LIKE
Filed Oct. 4, 1934
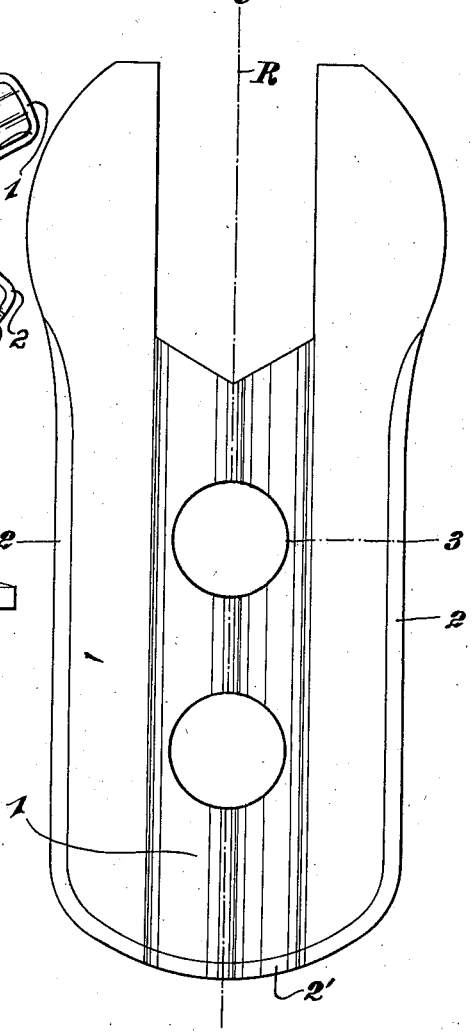
F. Gabriel
INVENTOR
By Glascock Downing Seebold
Attys.

Patented May 25, 1937

2,081,807

UNITED STATES PATENT OFFICE 2,081,807

KNIFE-BLADE FOR MEAT CUTTERS OR THE LIKE

Fritz Gabriel, Vienna, Austria, assignor to Maschinenfabrik A. Weiss & Co., Vienna, Austria, a company of Austria Application October 4, 1934, Serial No. 746,908
In Austria October 13, 1933

2 Claims. (Cl. 146—121)

Blade-shaped knives for meat cutters are already known, which are provided at both sides with cutting edges, disposed symmetrically with respect to the longitudinal axis of the knife. In order to provide the blade-knife with the required rigidity, the same is furnished with a folded portion extending vertically with respect to the symmetric line of the blade, so that the cutting edges are of complicated shape and therefore can be sharpened with great difficulty only. According to the present invention this drawback is removed in that the lateral cutting edges are straight or in the form of flat curves. In spite of the dispensation of the said folded stiffening portion of the knife extending transversely to the direction of cutting, it is possible to impart according to the present invention the necessary rigidity to the knife without increasing the thickness of the knife-blade by providing the knife-blade with elongated folds, for instance trough-shaped depressions, which are disposed in the symmetric line or parallel thereto, so that surfaces are formed, which are inclined with respect to the axis and operate like blades or like a fan and which, if desired, may be perforated. The fold or depression extending in the symmetric axis or parallel thereto imparts such a rigidity to the knife, that it does not vibrate even when cutting bacon.

One mode of carrying out the present invention is illustrated by way of example in the accompanying drawing in which Figs. 1 and 2 show the knife in plan view and in front view respectively.

Figure 3 shows the knife-blades mounted for operation.

The longitudinal axis R, passing through the axis of the knife-shaft, divides the knife-blade into two symmetric halves, so that flat cutting edges 2 are formed at both sides. The knife-blades are axially disposed behind one another approximately one inch apart on the hexagonal part of the knife-shaft and they are displaced with respect to each other and readily removable from said shaft. The knife-blade is provided with a longitudinal fold or depression 1, extending over the whole length of said knife-blade and the faces of which project out of the plane of the cutting edges 2 and are inclined with respect to the axis of the knife-shaft and operate like a shovel for mixing the material under treatment and cooling the same by sucking-in air. The knife may be provided with holes 3 for improving the said operations. The knife can be turned for 180 degrees about its longitudinal axis if one of its cutting edges has become blunt. A cutting edge 2', similar to the flat cutting edges 2 and adapted to be readily sharpened, is arranged at the front side of the knife, if the knife is provided with one fold or depression only for improving its rigidity in the longitudinal direction.

Figure 3 shows one form of a base 4 upon which the blades may be mounted one behind the other and in radial displacement with respect to one another. The blades are held in position on the shaft by any conventional means such as the nut 5 and washer 6.

What I claim is:—

1. In a meat cutter having a rotary shaft, a plurality of knife-blades mounted thereon, each knife-blade comprising two flat lateral cutting edges disposed symmetrically with respect to the longitudinal axis of the knife-blade and a cutting edge at its front extending between said two flat lateral cutting edges substantially in a radial curve from the center of the knife-blade, said knife-blade being bent to provide a depression on one side and a bulge on the other, said bent portion extending longitudinally of the blade and having at least one aperture provided centrally thereof.

2. In a meat cutter having a rotary shaft, a plurality of knife-blades mounted thereon, each knife-blade comprising two flat lateral cutting edges disposed symmetrically with respect to the longitudinal axis of the knife-blade, and a cutting edge at its front extending between said two flat lateral cutting edges substantially in a radial curve from the center of the knife-blade, said blade being bent to provide a depression on one side and a bulge on the other, said bent portion extending centrally and longitudinally of the blade and having at least one aperture provided centrally thereof.

FRITZ GABRIEL.